(12) United States Patent
Aboul-Magd et al.

(10) Patent No.: US 9,936,502 B2
(45) Date of Patent: Apr. 3, 2018

(54) SYSTEM AND METHOD FOR OFDMA RESOURCE MANAGEMENT IN WLAN

(71) Applicant: Huawei Technologies Co., Ltd., Shenzhen (CN)

(72) Inventors: Osama Aboul-Magd, Kanata (CA); Kwok Shum Au, Shenzhen (CN); Jung Hoon Suh, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/299,797

(22) Filed: Jun. 9, 2014

(65) Prior Publication Data
US 2015/0341933 A1 Nov. 26, 2015

Related U.S. Application Data

(60) Provisional application No. 61/917,791, filed on Dec. 18, 2013.

(51) Int. Cl.
*H04W 72/04* (2009.01)
*H04W 56/00* (2009.01)
(Continued)

(52) U.S. Cl.
CPC ....... *H04W 72/0453* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS 7,355,962 B2 4/2008 Li et al.
7,567,625 B2 7/2009 Oh et al.
(Continued)

FOREIGN PATENT DOCUMENTS

EP 2830246 A1 1/2015
JP 2005024447 A 1/2005
(Continued)

OTHER PUBLICATIONS

IEEE, "IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11™-2012 (Revision of IEEE Std 802.11-2007). 2793 pages.
(Continued)

*Primary Examiner* — Candal Elpenord
(74) *Attorney, Agent, or Firm* — Slater Matsil LLP (57) ABSTRACT

Embodiments are provided for implementing a control function in a Wireless Local Area Network (WLAN) for allocation of resources to multiple stations (STAs) to enable Orthogonal Frequency Division Multiple Access (OFDMA) communications. An embodiment method includes determining a plurality of transmission resources for OFDMA communications of a plurality of STAs in the WLAN. The determination includes allocating a plurality of subcarriers to the STAs. The method further includes signaling the determined transmission resources to the STAs. The signaling of the transmission resources is piggybacked on at least one of data and management frames, such as in a sub-header of a MAC frame, or is an explicit signaling, such as in one or more dedicated fields of a traffic specification information element. The transmission resources for OFDMA commu-
(Continued)

nications allow simultaneous transmissions of the STAs in the WLAN.

23 Claims, 3 Drawing Sheets

(51) Int. Cl.
  *H04L 5/00* (2006.01)
  *H04W 84/12* (2009.01)

(52) U.S. Cl.
  CPC ......... *H04L 5/0091* (2013.01); *H04W 56/001* (2013.01); *H04W 72/0446* (2013.01); *H04W 84/12* (2013.01)

(56) References Cited

U.S. PATENT DOCUMENTS

| | | | |
|---|---|---|---|
| 8,254,945 B2 * | 8/2012 | Lee | H04L 5/0037 370/208 |
| 8,379,590 B2 * | 2/2013 | Hooli | H04J 11/00 370/208 |
| 2004/0001429 A1 | 1/2004 | Ma et al. | |
| 2004/0190640 A1 | 9/2004 | Dubuc et al. | |
| 2005/0163094 A1 | 7/2005 | Okada et al. | |
| 2005/0201476 A1 | 9/2005 | Kim et al. | |
| 2006/0007484 A1 | 1/2006 | Tanimoto | |
| 2006/0007849 A1 | 1/2006 | Kim et al. | |
| 2006/0109814 A1 | 5/2006 | Kuzminskiy et al. | |
| 2006/0165188 A1 | 7/2006 | Wunder et al. | |
| 2007/0076639 A1 | 4/2007 | Chou | |
| 2007/0140102 A1 | 6/2007 | Oh et al. | |
| 2007/0223422 A1 | 9/2007 | Kim et al. | |
| 2007/0248046 A1 | 10/2007 | Khan | |
| 2008/0013599 A1 | 1/2008 | Malladi | |
| 2008/0049690 A1 | 2/2008 | Kuchibhotla et al. | |
| 2008/0109711 A1 | 5/2008 | Morioka et al. | |
| 2008/0117867 A1 * | 5/2008 | Yin | H04L 1/0029 370/329 |
| 2008/0123616 A1 | 5/2008 | Lee | |
| 2008/0153506 A1 * | 6/2008 | Yin | H04L 1/0026 455/452.2 |
| 2008/0227475 A1 | 9/2008 | Suemitsu et al. | |
| 2008/0232487 A1 | 9/2008 | Cleveland et al. | |
| 2009/0034526 A1 | 2/2009 | Ahmadi et al. | |
| 2009/0141681 A1 | 6/2009 | Hwang et al. | |
| 2009/0175260 A1 | 7/2009 | Wang et al. | |
| 2009/0252110 A1 | 10/2009 | Sridhara et al. | |
| 2009/0285163 A1 | 11/2009 | Zhang et al. | |
| 2009/0310692 A1 | 12/2009 | Kafle et al. | |
| 2010/0046457 A1 * | 2/2010 | Abraham | H04B 7/0408 370/329 |
| 2010/0046482 A1 | 2/2010 | Sridhara et al. | |
| 2010/0074198 A1 | 3/2010 | Morioka | |
| 2010/0113043 A1 * | 5/2010 | Hsuan | H04W 24/02 455/450 |
| 2010/0172316 A1 | 7/2010 | Hwang et al. | |
| 2010/0173651 A1 | 7/2010 | Park et al. | |
| 2010/0189069 A1 | 7/2010 | Sahinoglu et al. | |
| 2010/0202545 A1 | 8/2010 | Lim et al. | |
| 2011/0261708 A1 | 10/2011 | Grandhi | |
| 2011/0261742 A1 | 10/2011 | Wentink | |
| 2012/0063433 A1 | 3/2012 | Wentink | |
| 2012/0087348 A1 | 4/2012 | Wentink | |
| 2012/0177017 A1 | 7/2012 | Gong et al. | |
| 2012/0177144 A1 | 7/2012 | Lee et al. | |
| 2012/0244623 A1 | 9/2012 | Patel | |
| 2012/0327915 A1 | 12/2012 | Kang et al. | |
| 2013/0010664 A1 | 1/2013 | Kang et al. | |
| 2013/0107912 A1 | 5/2013 | Ponnampalam | |
| 2013/0177098 A1 | 7/2013 | Jung et al. | |
| 2013/0208715 A1 | 8/2013 | Roh et al. | |
| 2013/0223210 A1 | 8/2013 | Asterjadhi et al. | |
| 2013/0279382 A1 | 10/2013 | Park et al. | |
| 2013/0286959 A1 | 10/2013 | Lou et al. | |
| 2013/0301551 A1 | 11/2013 | Ghosh et al. | |
| 2013/0329658 A1 | 12/2013 | Liu | |
| 2014/0241240 A1 | 8/2014 | Kloper et al. | |
| 2014/0247824 A1 | 9/2014 | Sohn et al. | |
| 2014/0307653 A1 | 10/2014 | Liu et al. | |
| 2014/0314056 A1 | 10/2014 | Park et al. | |
| 2015/0063190 A1 | 3/2015 | Merlin et al. | |
| 2015/0124689 A1 | 5/2015 | Merlin et al. | |
| 2015/0124690 A1 | 5/2015 | Merlin et al. | |
| 2015/0131517 A1 | 5/2015 | Chu et al. | |
| 2015/0146808 A1 | 5/2015 | Chu et al. | |
| 2015/0163028 A1 | 6/2015 | Tandra et al. | |
| 2015/0172012 A1 | 6/2015 | Abeysekera et al. | |
| 2015/0244619 A1 | 8/2015 | Zheng et al. | |
| 2015/0382333 A1 | 12/2015 | Seok | |
| 2016/0081024 A1 | 3/2016 | Göktürk et al. | |
| 2016/0143010 A1 | 5/2016 | Kenney et al. | |

FOREIGN PATENT DOCUMENTS

| | | |
|---|---|---|
| JP | 2008252867 A | 10/2008 |
| JP | 2010171979 A | 8/2010 |
| JP | 2012516662 A | 7/2012 |
| JP | 2013530580 A | 7/2013 |
| JP | 2013201472 A | 10/2013 |
| WO | 2012158959 A1 | 11/2012 |
| WO | 2013055117 A2 | 4/2013 |

OTHER PUBLICATIONS

Qayyum et al., "Performance increase in CSMA/CA with RTS-CTS", Proceedings IEEE INMIC 2003, pp. 182-185.

Valentin et al., "Integrating multiuser dynamic OFDMA into IEEE 802.11 WLANS—LLC/MAC extensions and system performance", IEEE Communications Society, ICC 2008 proceedings, pp. 3328-3334.

International Search Report and Written Opinion received in International Application No. PCT/US2014/070522 dated Mar. 20, 2015, 9 pages.

Chun, J. et al., "Legacy Support on HEW frame structure," LG Electronics, IEEE 11-13/1057r0, Sep. 2013, pp. 1-8.

Ferdous, H. S. et al., "Enhanced IEEE 802.11 by Integrating Multiuser Dynamic OFDMA," 2010 Wireless Telecommunications Symposium (WTS), Apr. 2010, pp. 1-6, Tampa Florida.

Gross, James, et al., "OFDMA Related Issues in VHTL6," IEEE 802.11 07/206r1, RWTH Aachen—TU Berlin, Jan. 21, 2009, 17 pages.

Haile, G. et al., "C-OFDMA: Improved Throughput for Next Generation Wlan Systems Based on OFDMA and CSMA/CA," 2013 4th International Conference on Intelligent Systems, Modelling and Simulation, Jan. 2013, pp. 197-507, Bangkok.

Hart, Brian, et al., "DL-OFDMA for Mixed Clients," IEEE 802.11-10/0317r1, Cisco Systems, Mar. 2010, 24 pages.

IEEE Std. 802.11ac-2013 "Part 11: Wireless LAN Medium Access Control (MAC) and Physical Layer (PHY) Specifications Amendment 4: Enhancements for Very High Throughput for Operation in Bands below 6 GHz" IEEE Standard for Information Technology—Telecommunications and information exchange between systems Local and metropolitan area networks—Specific requirements, 2013, pp. 1-425.

Inoue, Y., et al., "Improved Spectrum Efficiency for the Next Generation WLANS," IEEE 802.11-12/0820r0, Jul. 2012 18 slides.

Jung, J. et al., "Group Contention-Based OFDMA MAC Protocol for Multiple Access Interference-Free in WLAN Systems," IEEE Transactions on Wireless Communications, vol. 11, No. 2, pp. 648-658, Feb. 2012.

Lichte, H., "Integrating Multiuser Dynamic Ofdma Into IEEE 802.11a and prototyping it on a real-time software-defined radio testbed," 2007 3rd International Conference on Testbeds and Research Infrastructure for the Development of Networks and Communities, Lake Buena Vista, FL, May 2007, pp. 1-9.

Ranjha, B., et al., "Interference Analysis of Interleaved and Localized Mapping Schemes in Ofdma System With Carrier Frequency (56) References Cited

OTHER PUBLICATIONS

Offset," IEEE Military Communications Conference, Oct. 29, 2012-Nov. 1, 2012, 6 pages, Orlando, FL.

Srinivasan, Roshni "System Description Document for the P802.16m Advanced Air Interface," Intel Corporation, IEEE 802.16m-09/0034r2, IEEE 802.16 Broadband Wireless Access Working Group, http://ieee802.org/16, Sep. 24, 2009, 79 pages.

Wang, F., et al., "Adaptive Slot and Bit Allocation Method for OFDMA Transmission Systems," 2006 International Symposium on Intelligent Signal Processing and Communications, Dec. 12-15, 2006, 4 pages.

Zheng, P., et al., "Wireless Networking Complete," Morgan Kaufmann. 2007; Section retrieved from hftp://proquest.safaribooksonline.com, Jan. 26, 2015. 22 pages.

3GPP TS 36.211, "3rd Generation Partnership Project; Technical Specification Group Radio Access Network; Evolved Jniversal Terrestrial Radio Access (E-UTRA); Physical channels and modulation (Release 11)," v11.5.0, 120 pages, Dec. 2013.

3GPP TS 36.213, "3rd Generation Partnership Project; Technical Specification Group Radio Access Network; Evolved Universal Terrestrial Radio Access (E-UTRA); Physical layer procedures (Release 10)," v10.11.0, 127 pages, Dec. 2013.

3GPP TS 36.321, "3rd Generation Partnership Project; Technical Specification Group Radio Access Network; Evolved Universal Terrestrial Radio Access (E-UTRA); Medium Access Control (MAC) protocol specification (Release 10)," V10.9.0, 54 pages, Jun. 2013.

\* cited by examiner

| ELEMENT ID | LENGTH (55) | TS INFO | NOMINAL MSDU SIZE | MAXIMUM MSDU SIZE | MINIMUM SERVICE INTERVAL | MAXIMUM SERVICE INTERVAL | INACTIVITY INTERVAL | SUSPENSION INTERVAL |
|---|---|---|---|---|---|---|---|---|
| 1 | 1 | 3 | 2 | 2 | 4 | 4 | 4 | 4 |

OCTETS:

| SERVICE START TIME | MINIMUM DATA RATE | MEAN DATA RATE | PEAK DATA RATE | BURST SIZE | DELAY BOUND | MINIMUM PHY RATE | SURPLUS BANDWIDTH ALLOWANCE | MEDIUM TIME |
|---|---|---|---|---|---|---|---|---|
| 4 | 4 | 4 | 4 | 4 | 4 | 4 | 2 | 2 |

OCTETS:

SYSTEM AND METHOD FOR OFDMA RESOURCE MANAGEMENT IN WLAN

This application claims the benefit of U.S. Provisional Application Ser. No. 61/917,791, filed on Dec 18, 2013.

TECHNICAL FIELD

The present invention relates to network communications, and, in particular embodiments, to a system and method for Orthogonal Frequency Division Multiple Access (OFDMA) resource management in Wireless Local Area Network (WLAN).

BACKGROUND

Wireless Local Area Networks (WLANs) commonly operate in unlicensed spectrum bands. Rules for operation in these bands force competing devices to share the available resources and defer their intended transmissions when the medium is sensed busy. Typically, a WLAN uses an Orthogonal Frequency Division Multiplexing (OFDM) transmission format in which all transmission resources are assigned to a single device. Random assignment is commonly achieved using carrier sense multiple access with collision avoidance (CSMA/CA). With CSMA/CA a device wins access to the medium, transmits its data up to a pre-defined period of time, and then gives up the medium for other devices to compete for transmission. In contrast, Orthogonal Frequency Division Multiple Access (OFDMA) is a transmission and access mechanism that accommodates multiple-user transmissions simultaneously. OFDMA is commonly implemented in wireless infrastructures operating in the licensed bands in order to meet timing information in terms of frame structure and the scheduling of resources among a subset of users. There is a need for efficient schemes for implementing OFDMA in WLANs.

SUMMARY OF THE INVENTION

In accordance with an embodiment, a method by a network component for managing orthogonal frequency-division multiple access (OFDMA) resources in a wireless local area network (WLAN) includes determining a plurality of transmission resources for OFDMA communications of a plurality of stations (STAs) in the WLAN. The determination includes allocating a plurality of subcarriers to the STAs. The method further includes signaling the determined transmission resources to the STAs. The transmission resources for OFDMA communications allow simultaneous transmissions of the STAs in the WLAN.

In accordance with another embodiment, a method for by a network component for managing OFDMA resources in a WLAN includes determining control parameters for establishing and synchronizing OFDMA communications for at least one of downlink and uplink transmissions between an access point (AP) and a plurality of STAs in the WLAN. The method further includes signaling the control parameters to the STAs.

In accordance with another embodiment, a network component for managing OFDMA resources in a WLAN comprises a processor and a computer readable storage medium storing programming for execution by the processor. The programming includes instructions to determine a plurality of transmission resources for OFDMA communications of a plurality of STAs in the WLAN. Determining the transmission resources includes at least one of allocating a plurality of subcarriers to the STAs. The network component is further configured to signal the determined transmission resources to the STAs, wherein the transmission resources for OFDMA communications allow simultaneous transmissions of the STAs in the WLAN.

In accordance with another embodiment, a method by a STA for OFDMA in a WLAN includes sending, to a network controller, information regarding at least one of scheduling transmissions for the STA, readiness of transmission, and preference of transmission. The method further includes receiving, from the network controller, a signaling of control parameters, which determine transmission resources for OFDMA communications of the STA. OFDMA communications are exchanged between the STA and an AP for at least one of downlink and uplink transmissions in accordance with the control parameters. The OFDMA communications exchanged between the STA and the AP are synchronized with one or more other STAs in accordance with the control parameters.

In accordance with yet another embodiment, a STA supporting OFDMA in a WLAN comprises a processor and a non-transitory computer readable storage medium storing programming for execution by the processor. The programming includes instructions to send, to a network controller, information regarding at least one of scheduling transmissions for the STA, readiness of transmission, and preference of transmission. The programming includes further instructions to receive, from the network controller, a signaling of control parameters, which determine transmission resources for OFDMA communications of the STA. The instructions further configure the STA to exchange, with an AP, OFDMA communications for at least one of downlink and uplink transmissions in accordance with the control parameters. The OFDMA communications exchanged between the STA and the AP are synchronized with one or more other STAs in accordance with the control parameters.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are system and method embodiments for implementing a control function in a WLAN for allocation of resources to multiple user devices, also referred to herein as stations (STAs), with OFDMA capability. The embodiments include using an OFDMA Coordination Function (OCF) for managing OFDMA resources in WLAN scenarios.

Figure 1:
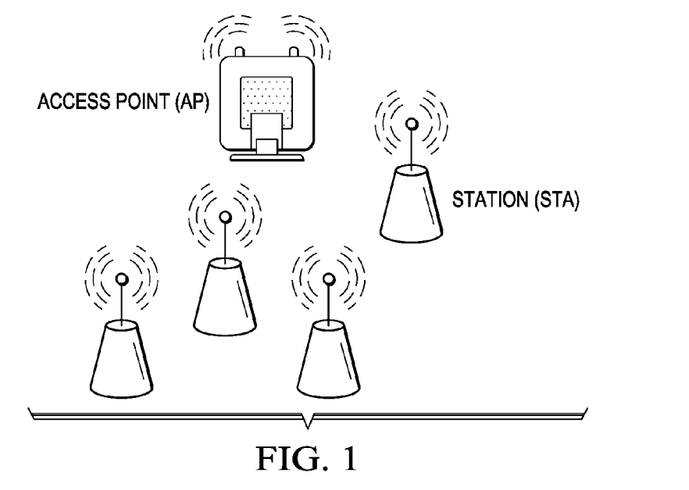
FIG. 1 illustrates a WLAN basic service set (BSS)

FIG. 1 shows an example of a WLAN basic service set (BSS) including an access point (AP) and one or more associated STAs. The AP is a communication device allowing the STAs to access and communicate using WLAN. The STAs are any user communication devices allowing users or subscribers to communicate with the AP and hence the WLAN. Examples of STAs include smartphones, tablet computers, laptop computers, desktop computers, sensor devices (e.g., smartwatch), and other mobile or communication devices with WLAN (e.g., WiFi) capability.

In general, an OFDMA system consists of $N_{sc}$ subcarriers ($N_{sc}$ is an integer) defined in a channel of certain bandwidth, W Megahertz (MHz). Each subcarrier represents a sub-range bandwidth or a frequency channel that can be used for uplink and/or downlink transmissions. For example in WLAN, the bandwidth W is usually set to 20 MHz. The subcarrier separation $\Delta f$ is given by $\Delta f = W/N_{sc}$. The OFDMA symbol duration $T_s$ is given by $1/\Delta f$. The quantity $N_{sc}$ is set at 64 in WLAN OFDM implementation. With the introduction of OFDMA to WLAN, the number of subcarriers $N_{sc}$ may be set to a higher value, such as 256 or 512 to support finer granularity. The number of subcarriers allocated to each user in a single transmission is one of the resource elements that is controlled or decided by the OCF.

Figure 2:
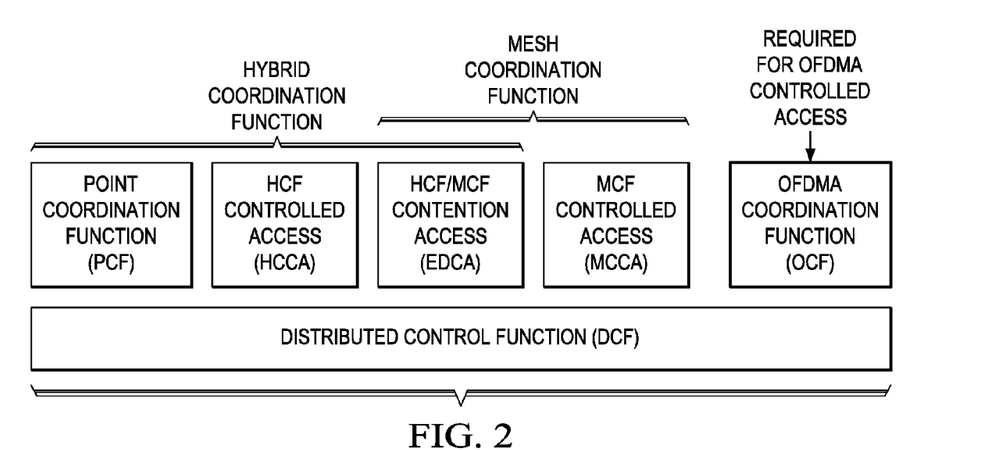
FIG. 2 illustrates an embodiment of WLAN control functions including a function for controlling OFDMA access.

FIG. 2 shows an embodiment of WLAN control functions including the OCF for controlling OFDMA access. A hybrid coordination function (HCF) controls both the controlled (scheduled) and the contention (random) access to the medium. A mesh coordination function (MCF) controls access (both controlled and contention) between neighboring mesh points (access points). The HCF provides a point coordination function (PCF), HCF controlled access (HCCA), and HCF/MCF contention access (EDCA). The MCF provides the EDCA and MCF controlled access. The OCF is a logical function that may reside either in a WLAN AP or in an access controller (AC). The AC is a server connected to the AP through an interface that allows the exchange of control information with the AP.

The OCF performs a number of functions that are needed for orderly operation of OFDMA in WLAN. The functions of the OCF include selection of users participating in every OFDMA transmissions, allocation of subcarriers to selected users, distribution of timing information (synchronization), and initiating uplink and downlink OFDMA transmission opportunities (TXOPs).

Figure 3:
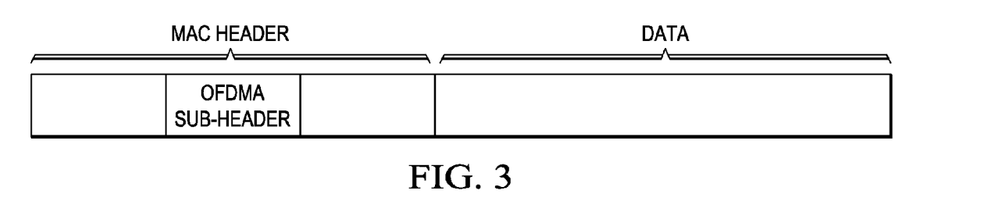
FIG. 3 illustrates an embodiment of a OFDMA MAC sub-header for controlling OFDMA operations in a WLAN.

The OCF is also configured to signal and exchange information with the STAs for selection of STAs and allocation of subcarriers for the STAs. In an embodiment, the signaling information may be piggybacked on data and management frames. FIG. 3 shows an OFDMA MAC sub-header for controlling OFDMA operations in a WLAN. The OFDMA sub-header is part of a MAC frame and carries information about the OCF functions. The OFDMA sub-header can be a single bit in the data or management frames indicating to the OCF whether the user (STA) sending the frame has frames ready for transmission in its buffer. Alternatively, the OFDMA sub-header may include multiple sub-fields that may indicate parameters useful for the OCF to perform a more elaborate scheduling. These subfields may include bandwidth requirements, delay bounds, and/or other parameters relevant to the operation of the OCF. The OFDMA sub-header is also referred to as an OFDMA control field. The OFDMA sub-header can also be used to transfer OCF information from the OCF to the user. The OFDMA sub-header can also be defined as an OFDMA control field dedicated for this purpose.

Figure 4:
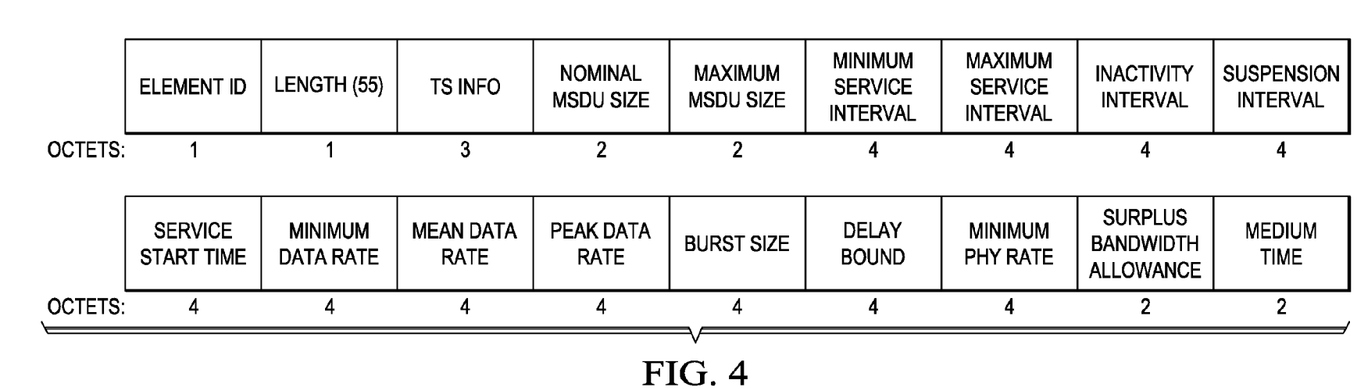
FIG. 4 illustrates a traffic specification (TSPEC) information element (IE) for carrying OFDMA control information in a WLAN.

In another embodiment, the communication between the OCF and the user can be done using explicit signaling (instead of the piggybacked signaling above). Explicit signaling can make use of signaling frames and information elements (IEs) that already exist in IEEE 802.11 specification, for example. FIG. 4 shows a Traffic Specification (TSPEC) IE that can be used for carrying OCF signaling from/to users (STAs), such as for exchanging traffic and reservation information between users and OCF. The information can be added to any suitable field group of fields of the IE shown in FIG. 4, depending on the size of the signaled information.

As described above, the functions of the OCF include allocation of subcarriers to selected users. In an embodiment, the OCF allocates subcarriers to users based on their traffic requirement. Further, the subcarriers may be assigned in groups that achieve some bandwidth granularity. The assignment of subcarriers in groups rather than a random fashion can simplify the designing of the overall OFDMA system.

The OFDMA is applicable both in uplink and downlink communications between the AP and the STA. A downlink OFDMA transmission starts when the AP competes and gains access to the wireless medium. Synchronization in the downlink direction is simpler than the uplink case since the AP and its related OCF can synchronize the multiple user transmissions using existing WLAN techniques and the physical layer (PHY) header information. On the other hand, synchronization at the start of an uplink OFDMA transmission opportunity (TXOP) is needed. The OCF is responsible for communicating synchronization information to users participating in the uplink OFDMA TXOP. The communication of the synchronization information can be in a special or dedicated frame that includes, for instance, clock information for each of the participating users. Timing information may take into account the distances between users and the AP as computed by the OCF.

Figure 5:
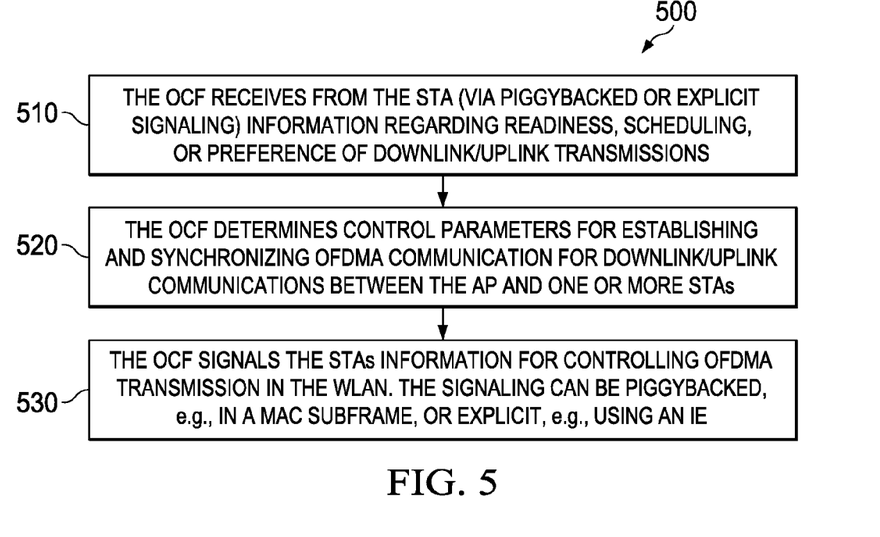
FIG. 5 illustrates an embodiment of a method enabling OFDMA control in a WLAN.

FIG. 5 shows an embodiment of a method 500 enabling OFDMA control in a WLAN. The method 500 is performed by the OCF function, e.g., at the AP or at the AC. At step, 510, the OCF receives from the STA (via piggybacked or explicit signaling) information regarding readiness, scheduling, or preference of downlink/uplink transmissions. At step 520, the OCF determines control parameters for establishing and synchronizing OFDMA communication for downlink/uplink communications between the AP and one or more STAs. In addition to the information from the STAs, this consideration can use information such as available network resources (e.g., subcarriers and bandwidth), number of users (STAs), distance of users, and/or other relevant information for optimizing OFDMA and its resources. At step 530, the OCF signals the STAs information for controlling OFDMA transmissions in the WLAN. The signaling can be piggybacked, e.g., in an MAC subframe, or explicit, e.g., using an IE. The signaling can include information for designating the STAs participating in OFDMA transmissions, allocation of subcarriers to the participating STAs, distribution of timing information (synchronization) for the STAs, initiating uplink and downlink OFDMA transmission opportunities (TXOPs), or combinations thereof.

Figure 6:
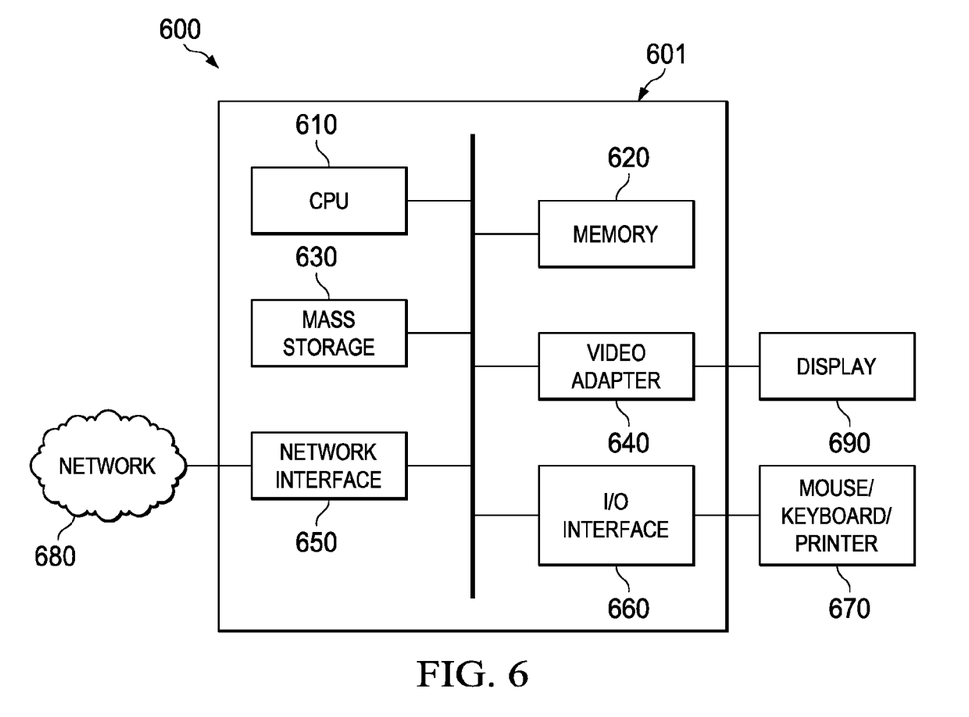
FIG. 6 is a diagram of a processing system that can be used to implement various embodiments.

FIG. 6 is a block diagram of a processing system 600 that can be used to implement various embodiments. For instance the processing system 600 can be part of a AP, a STA, or an AC in a WLAN. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an I/O interface 660 connected to a bus. The bus may be one or more of any type of several bus architectures including a memory bus or memory controller, a peripheral bus, a video bus, or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The video adapter 640 and the I/O interface 660 provide interfaces to couple external input and output devices to the processing unit. As illustrated, examples of input and output devices include a display 690 coupled to the video adapter 640 and any combination of mouse/keyboard/printer 670 coupled to the I/O interface 660. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a station (STA) for orthogonal frequency-division multiple access (OFDMA) in a wireless local area network (WLAN), the method comprising:
   sending, to a network controller, information regarding at least one of scheduling transmissions for the STA, readiness of transmission, and preference of transmission;
   receiving, from the network controller, a signaling of control parameters, the control parameters determining transmission resources for OFDMA communications of the STA; and
   exchanging, between the STA and an access point (AP), OFDMA communications for at least one of downlink and uplink transmissions in accordance with the control parameters, wherein the OFDMA communications exchanged between the STA and the AP are synchronized with one or more other STAs in accordance with the control parameters,
   wherein the signaling is received in an OFDMA sub-header of a media access control (MAC) data frame, and wherein the OFDMA sub-header is dedicated as an OFDMA control field for carrying OFDMA control information to STAs.

2. The method of claim 1, wherein the control parameters provide synchronization information to the STA and the one or more other STAs participating in an uplink OFDMA transmission opportunity (TXOP).

3. The method of claim 1, wherein the control parameters indicate at least one of a number of subcarriers allocated to each one of the STAs for a single transmission, selecting the STAs participating for an occurrence of OFDMA transmissions, allocating the subcarriers to the selected STAs, initiating at least one of uplink and downlink OFDMA transmission opportunities (TXOPs) in the WLAN, and distributing timing information to the STAs, wherein the timing information allows synchronization of transmissions of the STAs.

4. A station (STA) supporting Orthogonal Frequency Division Multiple Access (OFDMA) in a wireless local area network (WLAN), the STA comprising:
  a processor; and
  a non-transitory computer readable storage medium storing programming for execution by the processor, the programming including instructions to:
    send, to a network controller, information regarding at least one of scheduling transmissions for the STA, readiness of transmission, and preference of transmission;
    receive, from the network controller, a signaling of control parameters, the control parameters determining transmission resources for OFDMA communications of the STA; and
    exchange, between the STA and an access point (AP), OFDMA communications for at least one of downlink and uplink transmissions in accordance with the control parameters, wherein the OFDMA communications exchanged between the STA and the AP are synchronized with one or more other STAs in accordance with the control parameters,
  wherein the signaling is received in an OFDMA sub-header of a media access control (MAC) data frame, and wherein the OFDMA sub-header is dedicated as an OFDMA control field for carrying OFDMA control information to STAs.

5. The STA of claim 4, wherein the control parameters indicate at least one of a number of subcarriers allocated to each one of the STAs for a single transmission, selecting the STAs participating for an occurrence of OFDMA transmissions, allocating the subcarriers to the selected STAs, initiating at least one of uplink and downlink OFDMA transmission opportunities (TXOPs) in the WLAN, and distributing timing information to the STAs, wherein the timing information allows synchronization of transmissions of the STAs.

6. A method for managing orthogonal frequency-division multiple access (OFDMA) resources in a wireless local area network (WLAN), the method comprising:
  signaling, by a network component, transmission resources for OFDMA communications for at least one of downlink transmissions and uplink transmissions between an access point (AP) and a plurality of stations (STAs) in the WLAN,
  wherein the transmission resources are signaled in a media access control (MAC) data frame,
  wherein signaling is carried in an OFDMA sub-header of the MAC data frame, and wherein the OFDMA sub-header is dedicated as an OFDMA control field for carrying OFDMA control information to the STAs.

7. The method of claim 6, further comprising determining at least one of a number of subcarriers allocated to each one of the STAs for a single transmission, selecting the STAs participating for an occurrence of OFDMA transmissions, allocating the subcarriers to the selected STAs, initiating at least one of uplink and downlink OFDMA transmission opportunities (TXOPs) in the WLAN, and distributing timing information to the STAs, wherein the timing information allows synchronization of transmissions of the STAs.

8. The method of claim 7, wherein the selected STAs are grouped in a manner allowing bandwidth granularity.

9. The method of claim 7, further comprising determining the timing information in accordance with distances between the STAs and an access point (AP) in the WLAN.

10. The method of claim 6, wherein signaling the transmission resources is piggybacked on data frames.

11. A method for managing orthogonal frequency-division multiple access (OFDMA) resources in a wireless local area network (WLAN), the method comprising:
  signaling, by a network component, control parameters for establishing and synchronizing OFDMA communications for at least one of downlink transmissions and uplink transmissions between an access point (AP) and a plurality of stations (STAs) in the WLAN,
  wherein the control parameters are signaled in a media access control (MAC) data frame,
  wherein signaling is carried in an OFDMA sub-header of the MAC data frame, and wherein the OFDMA sub-header is dedicated as an OFDMA control field for carrying OFDMA control information to the STAs.

12. The method of claim 11, further comprising receiving, from the STAs, information regarding at least one of scheduling transmissions for the STAs, readiness of transmissions, and preference of transmissions.

13. The method of claim 12, wherein the information regarding the readiness of transmissions is indicated using a 1-bit of a MAC subheader, and wherein the 1-bit is set to indicate that the STAs have frames ready in a transmission buffer.

14. The method of claim 12, wherein the information regarding the scheduling of transmissions is indicated in a plurality of sub-fields in of a MAC header.

15. The method of claim 11, wherein the control parameters provide synchronization information to the STAs participating in an uplink OFDMA transmission opportunity (TXOP).

16. The method of claim 11, wherein signaling the control parameters is piggybacked on data frames.

17. A network component for managing Orthogonal Frequency Division Multiple Access (OFDMA) resources in a wireless local area network (WLAN), the network component comprising:
  a processor; and
  a non-transitory computer readable storage medium storing programming for execution by the processor, the programming including instructions to:
    signal transmission resources for OFDMA communications for at least one of downlink transmissions and uplink transmissions between an access point (AP) and a plurality of stations (STAs) in the WLAN,
  wherein the transmission resources are signaled in a media access control (MAC) data frame,
  wherein signaling is carried in an OFDMA sub-header of the MAC data frame, and wherein the OFDMA sub-header is dedicated as an OFDMA control field for carrying OFDMA control information to the STAs.

18. The network component of claim 17, wherein the instructions further comprise to determine the transmission resources for OFDMA communications includes determining at least one of a number of subcarriers allocated to each one of the STAs for a single transmission, selecting the STAs participating for an occurrence of OFDMA transmissions, allocating the subcarriers to the selected STAs, initiating at least one of uplink and downlink OFDMA transmission opportunities (TXOPs) in the WLAN, and distributing timing information to the STAs, wherein the timing information allows synchronization of transmissions of the STAs.

19. The network component of claim 17, wherein the programming includes further instructions to receive, from the STAs, information regarding at least one of scheduling transmissions for the STAs, readiness of transmissions, and preference of transmissions.

20. The network component of claim 17, wherein the instruction to signal the transmission resources is carried in at least a dedicated portion of an information element.

21. The network component of claim 17, wherein the network component is an access point (AP) associated with the STAs in a basic service set (BSS).

22. The network component of claim 17, wherein the network component is an access controller (AC) connected to an access point (AP) associated with the STAs, and wherein the AC is configured to communicate with the STAs via the AP.

23. The network component of claim 17, wherein the instruction to signal transmission resources are piggybacked on at least one of data and management frames.

\* \* \* \* \*